United States Patent Office 3,549,202
Patented Dec. 22, 1970

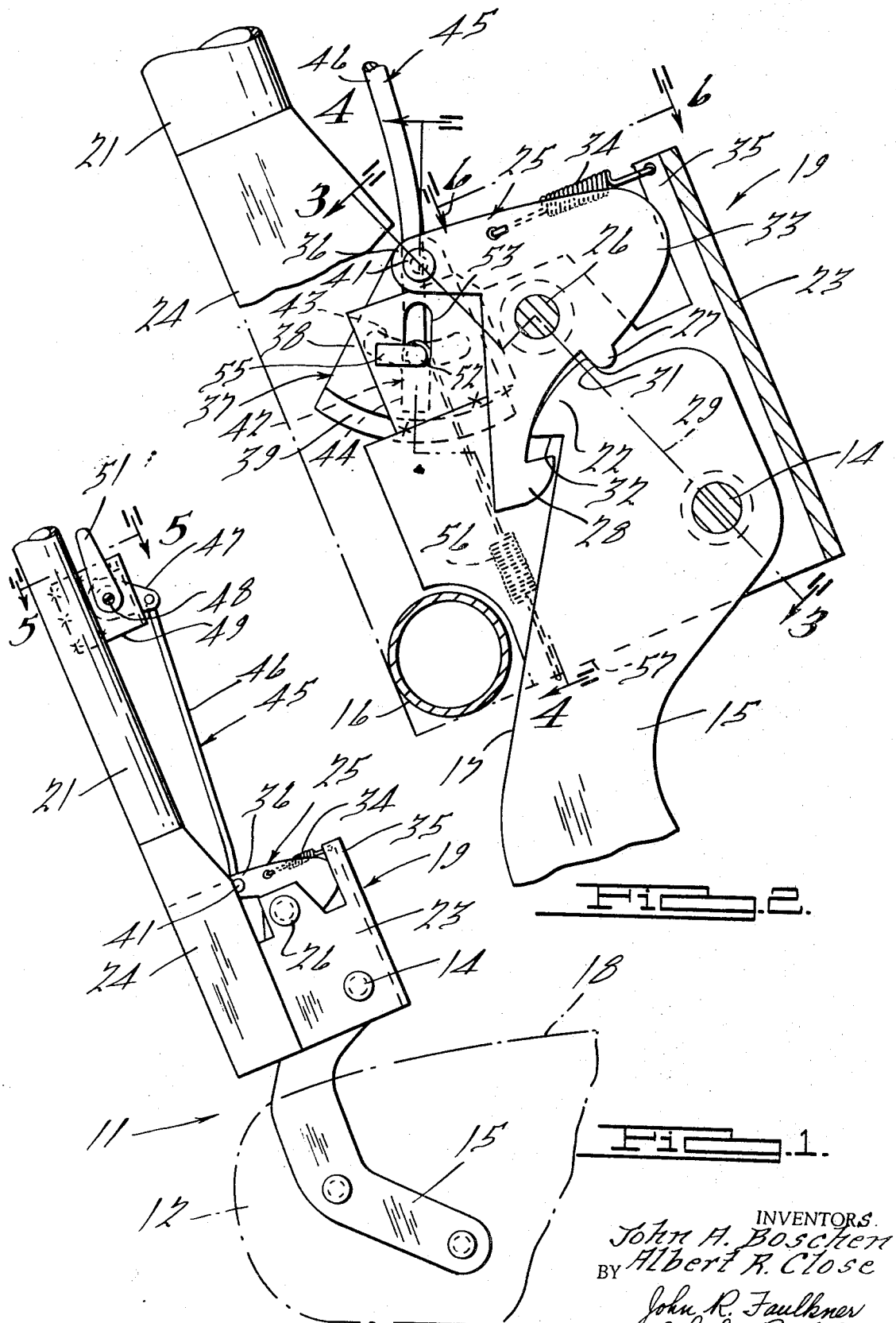

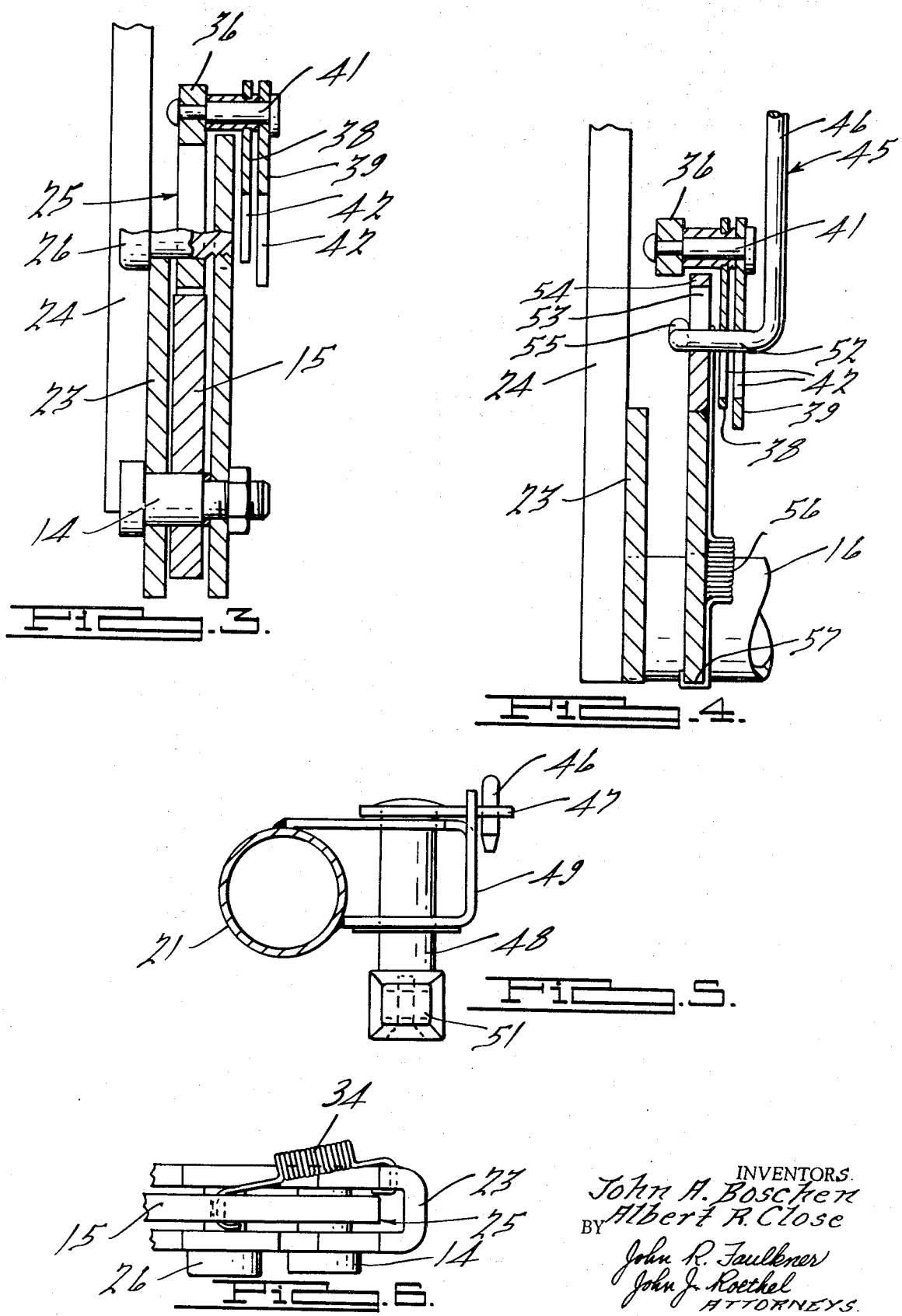

3,549,202
SEAT BACK INERTIA LATCH
John A. Boschen, Royal Oak, and Albert R. Close, Oak Park, Mich., assignors to Ford Motor Company, Dearborn, Mich., a corporation of Delaware
Filed May 1, 1969, Ser. No. 821,023
Int. Cl. B60n *1/02*
U.S. Cl. 297—379                                 8 Claims

ABSTRACT OF THE DISCLOSURE

A seat back latch mechanism for a vehicle seat assembly that has a horizontal seat structure and an upstanding backrest pivotally supported on fixed support arms for tiltable movement forwardly over the seat structure. A latch pawl normally is maintained in latching attitude and its inertia is a factor in preventing backrest movement upon the occurrence of a predetermined maximum vehicle deceleration rate. For intermediate deceleration rates movement of the latch pawl from latching latitude is controlled by a secondary inertia means in the form of free swinging pendulum means. Manual activation means also are provided.

BACKGROUND OF THE INVENTION

The prior art, as exemplified by U.S. Patent 2,873,794, discloses the use of an inertia latch mechanism for holding the pivoted or folding seat backrest of certain motor vehicle seat assemblies, such as those utilized in two-door models, against tiltable movement relative to the horizontal seat cushion. In such an inertia latch mechanism, the latching pawl or the like normally is in a latching attitude and its inertia or resistance to movement from this attitude is utilized to prevent forward tilting movement of the backrest when the deceleration rate of the vehicle is above a predetermined maximum, such as occurs in an accident or under "panic stop" conditions. The latching of the backrest under such conditions contributes to the stability of the seat occupant and also enables the backrest to function as a protective barrier for the rear seat occupants.

If the rate at which force is applied to the backrest to tilt it forwardly is moderate, the latch pawl is movable either by gravity or spring bias to a non-latching attitude. The backrest thus may be tilted forwardly by the application of moderate manual pressure at a low rate such as is desirable to permit ingress or egress to or from the rear seat area of the passenger compartment.

It is an object of the present invention to provide a further inertial responsive means to inhibit movement of the latching pawl when the vehicle is decelerated at a rate greater than that which would cause the application of force to the backrest equivalent to that caused by the application of moderate manual pressure but less than the predetermined maximum rate caused by accident induced stoppage or panic stops of the vehicle. The further inertial responsive means gives greater sensitivity to the latching mechanism.

BRIEF SUMMARY OF THE INVENTION

The seat back latch mechanism embodying the present invention is particularly adapted for use with a vehicle seat assembly having a substantially horizontal seat structure or cushion and an upstanding backrest pivotally supported on fixed support arms, for forwardly tiltable movement over the seat structure. The latch mechanism comprises a latch lug projecting from a support arm and a latch pawl pivotally supported on the backrest having a camming abutment and a latching abutment. The camming abutment in normal upright position of the backrest has abutting engagement with the latch lug to hold the latch pawl and its latching abutment in latch lug engaging attitude. Latch engaging attitude means that the latching abutment is not necessarily in contact with the latch lug but that it is in position to engage the latter upon a predeermined degree of forward tilting movement of the seat backrest occurring. Spring means urges the latch pawl about its pivot in a direction to displace the latching abutment from latch lug engaging attitude upon movement of the camming abutment out of abutment with the latch lug. The inertia of the latch pawl, however, upon an accelerated forward tilting force being applied to the backrest inhibits movement of the latch pawl in spring urged direction and causes the latching abutment to engage the latch lug to prevent forward tilt of the backrest beyond a predetermined minimal degree of such movement.

A pendulum means is pivotally suspended from the latch pawl for free swinging movement. The pendulum means is operatively associated with an abutment means. The pendulum means has a neutral position relative to this abutment means in which position the pendulum means and the latch pawl from which the latter is suspended are bodily shiftable about the latch pawl pivot without interference from the abutment means. Should the pendulum means be displaced from the neutral position upon the application to the backrest of an accelerated force less than the accelerated force that would cause the latch pawl of its own inertia to remain in latch lug engagement attitude, the pendulum means coacts with the abutment means to block movement of the latch pawl about its pivot out of lach lug engagement attitude.

The abutment means includes a manual actuator for bodily shifting the pendulum means and thereby the pawl out of latching attitude when the pendulum means has been displaced from its neutral position and it is desired to release the latching pawl to permit forward tilting movement of the backrest.

BRIEF DESCRIPTION OF THE DRAWINGS

Other objects, advantages and features of the present invention can be made more apparent as this description proceeds, reference being had to the accompanying drawings, wherein:

FIG. 1 is a partial side view of a motor vehicle seat frame having a latch mechanism constructed in accordance with the present invention mounted thereon;

FIG. 2 is an enlarged view in part sectional of the mechanism shown in FIG. 1;

FIG. 3 is a sectional view taken on the line 3—3 of FIG. 2;

FIG. 4 is a sectional view taken on the line 4—4 of FIG. 2;

FIG. 5 is a sectional view taken on the line 5—5 of FIG. 1; and

FIG. 6 is a sectional view taken on the line 6—6 of FIG. 2.

DETAILED DESCRIPTION OF THE INVENTION

Referring now to the drawings, and in particular to FIGS. 1 and 2, there is illustrated in part a vehicle seat assembly, generally designated 11, only one side of which is visible. The seat assembly 11 comprises a substantially horizontal seat or cushion structure 12 and a normally upstanding seat backrest 13 pivotally supported on pivot shafts 14 carried on support arms 15. These support arms 15 are curved members fixedly mounted on the seat cushion structure 12.

The upstanding position of the backrest when in normal upright position generally is self-determined. For example, frame member 16 may abut the rear edge 17 of the support arms 15, or the backrest cushion (not shown)

may abut the seat cushion 18 (shown in dot and dash outline). The present invention is concerned only with controlling the forward tilting of the backrest 13 about the pivot shafts 14, i.e., in a clockwise direction as viewed in FIGS. 1 and 2. This control is accomplished through a latch mechanism, generally designated 19, all of the components of which except one are mounted on the backrest frame structure and more particularly the side frame member 21.

The single component of the latch mechanism 19 not mounted on the backrest is a latch lug 22 carried on the upper end of a support arm 15.

The components of the latch mechanism mounted on the backrest are supported within a U-shaped bracket or housing 23 welded to a plate extension 24 of the backrest side frame member 21. A latch pawl, generally designated 25, pivotally carried on a pivot shaft 26 is the major functional element of the latch mechanism 19. The pivot axis defined by the shaft 26 parallels the pivot axis of the shaft 14 about which the backrest 13 pivots or tilts.

The latch pawl 25 has a camming abutment 27 and a latching abutment 28. As best seen in FIG. 2, in normal at rest position of the backrest 13 relative to the seat structure 12, the camming abutment 27 and the latching abutment 28 lie on opposite sides of a line 29 passing through the centers of the pivot shafts 14 and 26 and straddle the latch lug 22. The camming abutment 27 abuts the side face 31 of the latch lug 22 while the latching abutment 28 which is in the form of a hooklike appendage is in spaced but aligned relation to the side face 32 of the latch lug 22. For the purpose of definition, the latching abutment 28 is considered, when in the FIG. 2 position, to be in latch lug engaging attitude.

The latch pawl 25 has a substantial overhang 33 on the camming abutment 27 side of the pivot shaft 26 and also is under the influence of a tension spring 34 extending from the pawl to an extension 35 of the support bracket or housing 23. The spring 34 is designed to exert a light rotating force in a clockwise direction on the latch pawl 25. Thus, if the backrest 13 is tilted forwardly or in a clockwise direction about the pivot shaft 14 at a moderate rate so as momentarily to provide clearance between the camming abutment 27 and the side face 31 of the latch lug 22, the spring 34 will cause the latch pawl 25 to rotate in a clockwise direction about its pivot axis 26 moving the latching abutment 28 out of latch lug engaging attitude. The backrest 13 then may be tilted forwardly to its fullest extent.

If a sudden or rapidly applied force is exerted on the backrest tending to throw the latter forwardly about its pivot axis 14, the inertia of the latch pawl 25 to clockwise movement about its pivot axis 26 is sufficient, despite the biasing of the spring 34, to hold the latch pawl latching abutment 28 in latch lug engaging attitude until the latching abutment engages the side face 32 of the latch lug 22. This will effectively inhibit any further forward titlting movement of the backrest. The force exerted on the backrest is of a magnitude such as would occur on rapid deceleration of the vehicle as a result of a collision or as a result of the slamming on of the vehicle brakes to produce what is called a "panic stop" condition.

There are times, however, when it is desirable that the backrest be latched against forward tilting movement upon deceleration of the vehicle at a rate less than that resulting from a collision or panic stop. It has also been found that the vehicle backrest upon rebounding from an attempt to pivot forwardly about the pivot axis will become unlatched so that upon a secondary impact, such as occurs when the vehicle occupant is being bounced around in the rear passenger compartment, the seat will become unlatched and tilt forwardly losing its effectiveness as a barrier and perhaps causing further injury to the person occupying the seat cushion forwardly of the backrest.

Accordingly, it is a feature of the present invention to provide for holding the latch pawl latching abutment 28 in latch lug 22 engaging attitude under deceleration rates less than accommodated by the inertia of the latch pawl and the biasing force of its spring 34 and also under rebound conditions.

The latch pawl 25 has on the latching abutment side of the pivot shaft 26 an overhanging appendage 36 from which a pendulum means 37 is suspended. The pendulum means comprises a pair of pendulum weights in the form of substantially triangular plates 38 and 39 which are freely swingable from their apices about a pivot stud 41 secured to the pawl appendage 36.

The pendulum or inertia plate 38 is slightly shorter than the plate 39 and, therefore, the two plates have different natural frequencies of swinging movement, for a purpose to be explained. Each plate has substantially T-shaped slot 42 therein. The cross bar 43 of the slot 42 is a true radius about the pivot axis defined by the pivot stud 41. The vertical leg 44 of the slot extends radially away from the cross bar 43. In an at rest position the T-shaped slots in each plate overlie each other.

An abutment means, generally designated 45, is positioned to coact with the pendulum or inertia plates 38 and 39. The aboutment means 45 comprises an elongated rod 46 which extends down the backrest frame member 21. At its upper end the rod 46 is coupled to a lever 47 carried on one end of a shaft 48 journalled in a bracket 49 secured to the backrest side frame member 21. The shaft 48 has at its other end a handle 51. At its lower end the rod 46 has a right angled bend 52 which projects through the T-shaped slots in the pendulum or inertia plates 38 and 39 and also through a slot 53 extending radially of the pivot stud 41 in an upper extension 54 of the support or housing 23. The slot 53 coincides at its lower end with the cross bar 42 portions of the T-shaped slots 42 and extends upwardly toward the pivot stud 41. The rod end 52 terminates in another right angle bend 55 which functions as a retention device for holding the rod end 52 in operative relationship to the plates 38 and 39.

The rod 45 is maintained in its lowermost position, as shown in FIG. 2, by a tension spring 55 which extends from the base edge 56 of the bracket or housing 23 to the rod end 52.

As will be understood with reference to FIG. 2, the pendulum means 37, i.e., the pendulum or inertia plates 38 and 39, have a neutral position with respect to the abutment means 45 rod end 46. In this neutral position the pendulum plates 38 and 39 are free to move upwardly with the latch pawl 25 as the latter is pivoted about the pivot shaft 26. The abutment means rod end 52 merely idles in the vertical leg portions 44 of the T-slots 42 and the pendulum or inertia plates 38 and 39. Thus, if it is desired to tilt the backrest 13 forwardly at a moderate rate, so as to permit ingress and egress to and from the rear passenger compartment of the vehicle, the latch pawl 25 under the influence of the spring 34 is free to move in an unlatching direction.

Upon the vehicle being rapidly decelerated, as would occur in a collision or upon the occasion of a "panic stop," the inertia of the latch pawl 25 will prevent the latter from moving to an unlatched position and the latching abutment 28 thereon will engage the latch lug 22 to prevent movement of the backrest in a forward tilt direction beyond the minimum amount permitted by the clearance between the latching abutment 28 and the face 32 of the latch lug 22.

Upon any tendency of the backrest 21 to tilt forwardly at a rate between the moderate rate permitting automatic unlatching and the maximum rate resulting from collision impact or panic stop condition, the pendulum or inertia plates 38 and 39 will swing about their pivot stud 41 so that the abutment means right angle bend portion 52 will be located in a cross bar portion of the T-slot 42 of the plates 38 and 39. As a result, the plates 38 and 39 prevent the latch pawl 25 from pivoting about its pivot shaft 26 to a position in which it is out of latch lug engagement attitude. In a specific case, such as when the vehicle brakes are applied at a rate less than that which would cause a "panic stop," the inertia plates 38 and 39 will swing forwardly or in a counterclockwise direction about their pivot axis 41 so that the rearward side of the cross bar 43 of each T-slot 42 encompasses the release rod. In this position, the latch pawl 25 cannot release as the inertia plates 38 and 39 are blocked by the release rod from being raised.

Although the latch mechanism 19 would work with only a single inertia plate, it is conceivable that under vehicle impact conditions, the seat back, cushion, floor pan and seat adjuster assemblies might move or vibrate in such a manner as to cause undesired unlatching. This could occur if the seat back were starting to move forward again upon rebounding just at the same instant that the inertia plate passed through a central position. To prevent this, the two inertia plates 38 and 39 are used. Since inertia plates have different lengths and, therefore, different natural frequencies of swinging, it is highly unlikely they would pass through the central position at the same moment. Since the only time the latch pawl 25 can release is when both plates 38 and 39 are in the central position, usually after they have come to rest, a time delay release is obtained.

The handle 51 is used only in the event that the latch parts become stuck or damaged or the vehicle is parked on a steep hill thereby moving the pendulum or inertia plates 38 and 39 from their neutral position relative to the end 52 of the abutment means rod 46. If the handle 51 is rotated in a counterclockwise direction as viewed in FIG. 1, the release rod 46 is raised. Its right angled end 52 is guided by the vertical slot 53 in the support bracket and causes the pendulum or inertia plates 38 and 39 to be raised. As the plates 38 and 39 are raised, they will cause the latch pawl 25 to be rotated in a clockwise direction about the pivot stud 26 thereby causing the latching abutment 28 to be moved out of latch lug 22 engagement attitude. In effect, the latch pawl 25 is forced to a latched release position.

We claim:

1. A seat back latch mechanism for a vehicle seat assembly having a substantially horizontal seat structure and an upstanding backrest pivotally supported on fixed support arms for forwardly tiltable movement over the seat structure, said latch mechanism comprising:

a latch lug projecting from a support arm,
a latch pawl pivotally supported on said backrest and having a camming abutment and a latching abutment,
said camming abutment in normal upright position of said backrest having abutting engagement with said said latch lug to hold said latch pawl and the latching abutment thereon in latch lug engaging attitude,
spring means urging said latch pawl about its pivot in a direction to displace said latching abutment from latch lug engaging attitude upon movement of said camming abutment out of abutment with said latch lug,
the inertia of said latch pawl upon an accelerated tilting force being applied to the backrest inhibiting movement of the latch pawl in spring urged direction to cause the latching abutment to engage the latch lug and prevent forward tilt of the backrest beyond a predetermined minimum degree of movement,
pendulum means pivotally suspended from said latch pawl for free swinging movement,
and abutment means positioned to coact with said pendulum means,
said pendulum means having a neutral position relative to said abutment means in which position the pendulum means and the latch pawl are bodily shiftable about the latch pawl pivot without interference from the abutment means,
said pendulum means being displaceable from said neutral position upon the application to said backrest of an accelerated force less than the accelerated force which would cause the latch pawl of its own inertia to remain in latch lug engagement attitude,
said pendulum means when so displaced coacting with said abutment means to block movement of said latch pawl about its pivot out of latch lug engagement attitude.

2. A latch mechanism according to claim 1, in which:
the abutment means comprises a manual release rod supported on the backrest and coupled to one end to a release lever and having at its other end a pendulum means engageable abutment portion,
a second spring means urges said manual release rod to a predetermined nonactuated position,
said abutment portion upon manual actuation of the rod against the resistance of said second spring means being engageable with the pendulum means to bodily shift the latter in a direction to swing the latch pawl and thereby its latching abutment out of latch lug engaging attitude whereby the backrest may be forwardly tilted.

3. A latch mechanism according to claim 2, in which:
the pendulum means comprises a plurality of independently swingable weights having different natural frequencies of swinging moment to provide a time delay effect before all weights return to a neutral position after having been displaced therefrom.

4. A latch mechanism according to claim 1, in which:
the pendulum means comprises a plurality of independently swingable weights having different natural frequencies of swinging moment to provide a time delay effect before all weights return to a neutral position after having been displaced therefrom.

5. A latch mechanism according to claim 1, in which:
the pendulum means comprises a pair of substantially triangular plates pivotally suspended at their apices from the latch pawl,
one of said plates being longer than the other thereby to have a different natural frequency of swinging movement,
said plates when displaced from the neutral position in which free movement of the latch pawl is permitted returning to said neutral position at different time intervals.

6. A latch mechanism according to claim 5, in which:
the abutment means comprises a release rod supported on the backrest,
said release rod being coupled at one end to an operating means and having at its other end an abutment portion,
said abutment portion projecting through substantially T-shaped slots in the pendulum means plates,
a second spring means urges said release rod to a predetermined nonactuated position,
upon actuation of the rod against the resistance of said spring means said abutment portion being engageable with the pendulum means plates to bodily shift the latter in a direction to swing the latch pawl and thereby the latching abutment out of latch lug engaging attitude whereby the backrest may be forwardly tilted.

7. A latch mechanism according to claim 1, in which:
the pendulum means comprises at least a pair of triangular plates pivotally suspended at their apices from the latch pawl,
said plates being of different lengths so as to have different natural frequencies of swinging movement,
said plates having overlying substantially T-shaped slots through which a portion of the abutment means projects, said projecting portion in a neutral position of the pendulum means relative to the abutment means being positioned to be traversed by the cross bar or vertical leg of the T-shaped slots.

8. A latch mechanism according to claim 7, in which: the abutment means projecting portion is on one end of a release rod supported on the backrest, said release rod having an operator coupled to the other end, and a second spring means urges said release rod to a nonactuated position, upon actuation of the rod against the resistance of said spring means said projecting portion being engageable with the pendulum means plates at a T-slot surface opposite the vertical slot leg to bodily shift the latter in a direction to swing the latch pawl and thereby the latching abutment out of latch lug engaging attitude whereby the backrest may be forwardly tilted.

References Cited

UNITED STATES PATENTS

| | | | |
|---|---|---|---|
| 2,559,548 | 7/1951 | Seigneur | 297—379 |
| 2,873,794 | 2/1959 | Leslie | 297—379 |
| 3,028,198 | 4/1962 | Murr | 297—379 |
| 3,123,401 | 3/1964 | Komenda | 297—379 |
| 3,387,885 | 6/1968 | Boschen | 297—379 |
| 3,405,971 | 10/1968 | Kobrehel | 297—379 |
| 3,433,524 | 3/1969 | Close | 297—379 |

FRANCIS K. ZUGEL, Primary Examiner

U.S. Cl. X.R.

297—216